TRANSFLUXOR STORAGE MATRIX

Original Filed Sept. 8, 1959 7 Sheets-Sheet 1

Inventor
D.S.RIDLER-R.GEORGE-
J.A.W.BUTCHER-
R.KITAJEWSKI
By
Robert Harding Jr.
Attorney (a) (b)

(a) (b)

Inventor
D.S.RIDLER-R.GEORGE-
J.A.W.BUTCHER-
R.KITAJEWSKI
By Robert Harding Jr.
Attorney

*Inventor*
D.S.RIDLER-R.GEORGE-
J.A.W.BUTCHER-
R.KITAJEWSKI
*By*
*Attorney*

Dec. 17, 1968 D. S. RIDLER ET AL 3,417,383

TRANSFLUXOR STORAGE MATRIX

Original Filed Sept. 8, 1959 7 Sheets-Sheet 4

*Inventor*
D.S.RIDLER-R.GEORGE-
J.A.W.BUTCHER-
R.KITAJEWSKI
*By* Robert Harding Jr.
*Attorney*

*Inventor*
D.S.RIDLER-R.GEORGE-
J.A.W.BUTCHER-
R.KITAJEWSKI
*By* Robert Harding Jr.
*Attorney*

Inventor
D.S.RIDLER-R.GEORGE-
J.A.W.BUTCHER-
R.KITAJEWSKI
By Robert Harding Jr.
Attorney Inventor
D.S.RIDLER-R.GEORGE-
J.A.W.BUTCHER-
R.KITAJEWSKI
By *Robert Harding Jr.*
Attorney 3,417,383
TRANSFLUXOR STORAGE MATRIX Desmond Sydney Ridler, Roger George, John Anthony Weeks Butcher, and Ryszard Kitajewski, London, England, assignors to International Standard Electric Corporation, New York, N.Y., a corporation of Delaware
Continuation of application Ser. No. 838,727, Sept. 8, 1959. This application May 20, 1964, Ser. No. 371,868
Claims priority, application Great Britain, Sept. 15, 1958, 29,453/58
2 Claims. (Cl. 340—174)

ABSTRACT OF THE DISCLOSURE

A coordinate array of rows and columns of ferromagnetic units are provided for the storage of intelligence. Each unit comprises a piece of ferromagnetic material having a substantially rectangular hysteresis locp and having four holes to form two storage cells and two reading cells.

*Intelligence storage equipment*

The present invention relates to intelligence storage equipment, and especially to such equipment in which intelligence is stored in any array of ferromagnetic storage cells. The present application is a continuation of our earlier application Ser. No. 838,727, filed Sept. 8, 1959, now abandoned, and is entitled to the benefit of that filing date.

Each cell in such an array is formed of a ferromagnetic material having a substantially rectangular hysteresis loop, i.e. of a so-called square-loop material. An element of intelligence is stored in one of the cells by setting that cell to either one of its two remanent conditions, dependent on which of two conditions, referred to as 0 or 1, is to be stored. In the majority of such arrays, when reading the stored data it is necessary to reset the cell or cells to be read to the 0 condition. A cell gives a relatively large output if this resetting operation drove it from its 1 condition to its 0 condition and little or no output if it was already in its 0 condition.

Such arrangements have the disadvantage that reading destroys the stored intelligence, so that if this intelligence is required to be retained after read-out has occurred, it is necessary for it to be re-recorded into the appropriate cell or cells.

The present invention avoids this disadvantage by the provision of an arrangement in which read-out can be effected without destroying the stored intelligence.

According to the present invention there is provided a ferromagnetic unit such as may be used in intelligence storage equipment, in which a piece of a ferromagnetic material having a substantially rectangular hysteresis loop has a plurality of holes in it, the material surrounding each said hole forming one cell, in which at least one of said cells is a storage cell which can be set to either one of its two stable remanent states to store intelligence and is threaded by an output wire, in which at least one of said cells other than the cell or cells used to store intelligence is a reading cell and is threaded by a reading wire, in which in response to the application of an electrical pulse to the reading wire threading said reading cell or cells an output occurs on the output wire threading said storage cell or cells the nature of which indicates the intelligence stored in said storage cell or cells, and in which said cells are so dimensioned and so located with respect to each other, and the characteristics of said pulse are such, that the reading of said storage cell or cells does not destroy the intelligence stored therein.

The present invention will now be described with reference to the accompanying drawings, in which:

FIGURE 1 shows one form of storage unit according to the invention, in which three storage cells, each formed by the material surrounding a hole in a block or plate of a square-loop material, are used for one element of intelligence.

FIGURES 2*a* and 2*b* are diagrams explanatory of the operation of an arrangement such as that of FIGURE 1.

FIGURE 3 is a typical hysteresis loop for a square-loop material such as is used in the arrangement of FIGURE 1.

FIGURES 4*a* and 4*b* are further explanatory diagrams.

Figure 6:
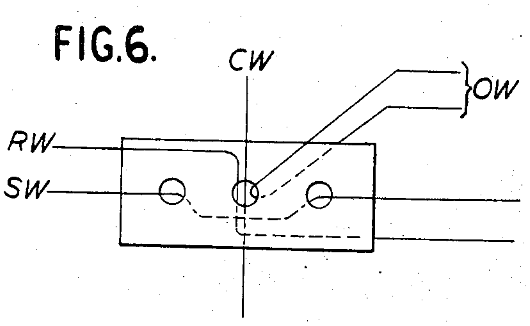
FIGURE 6 shows an alternative storage unit according to the present invention, but also using three cells for one element.

FIGURES 7*a* and 7*b* are diagrams explanatory of the operation of the storage unit shown in FIGURE 6.

Figure 8:
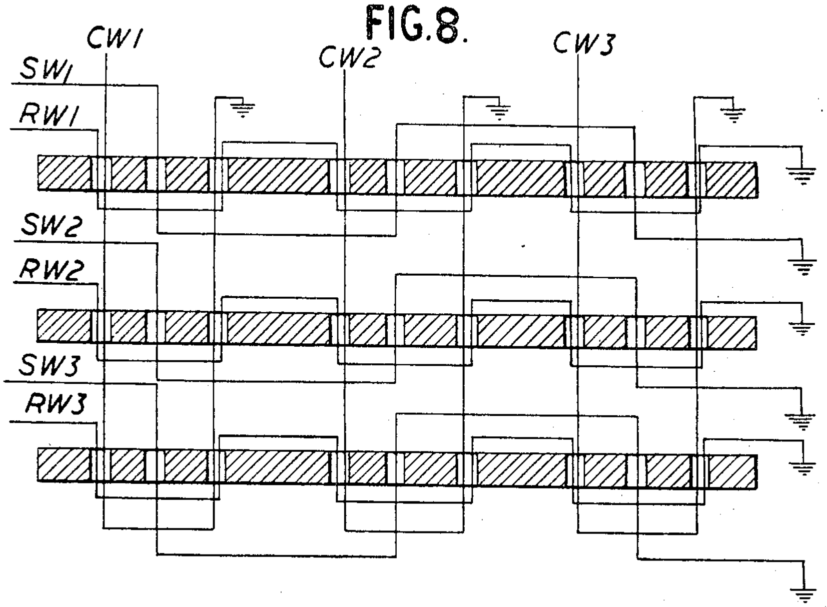

FIGURE 8 shows a co-ordinate memory array having a capacity for 9 elements of intelligence in 3 rows of 3 elements each. Each element uses a single unit such as that of FIGURE 1, and each row of cells is formed by a strip of square-loop material in which are a number of holes.

Figure 9:
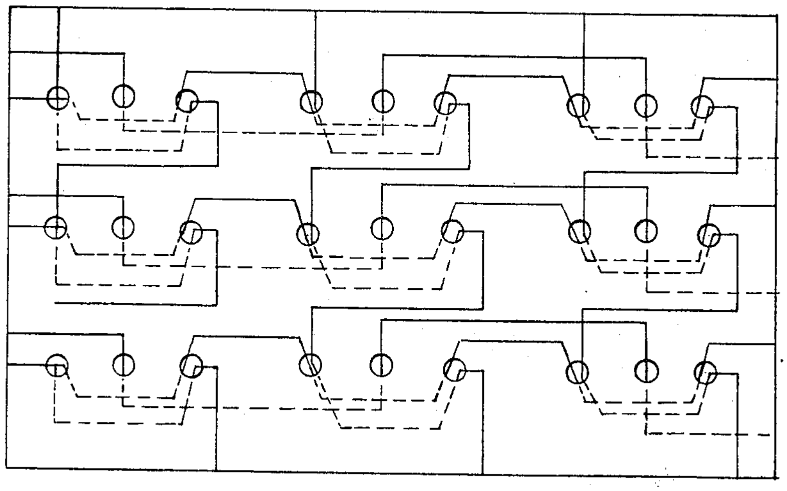

FIGURE 9 shows an array similar to that of FIGURE 8, but using a single perforated plate of square-loop material.

Figure 10:
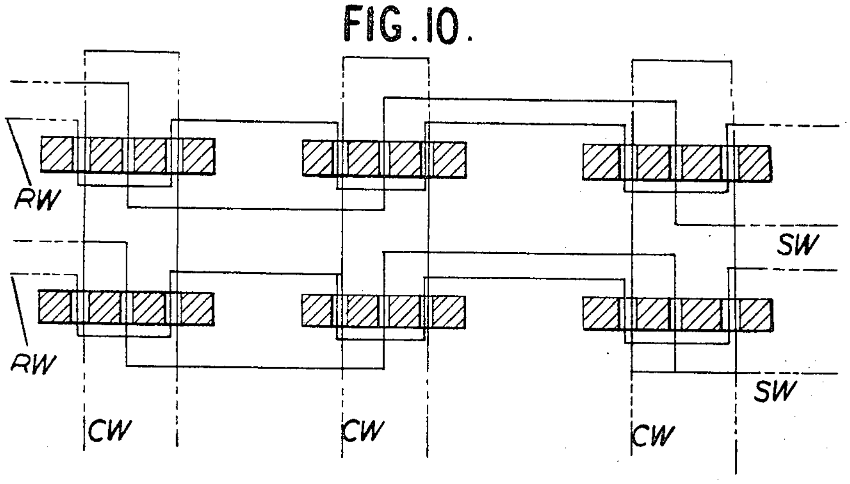

FIGURE 10 is an array similar to those of FIGURES 8 and 9, but in which for each element of intelligence there is a separate memory unit consisting of a piece of a square-loop material having three holes.

Figures 11, 12:
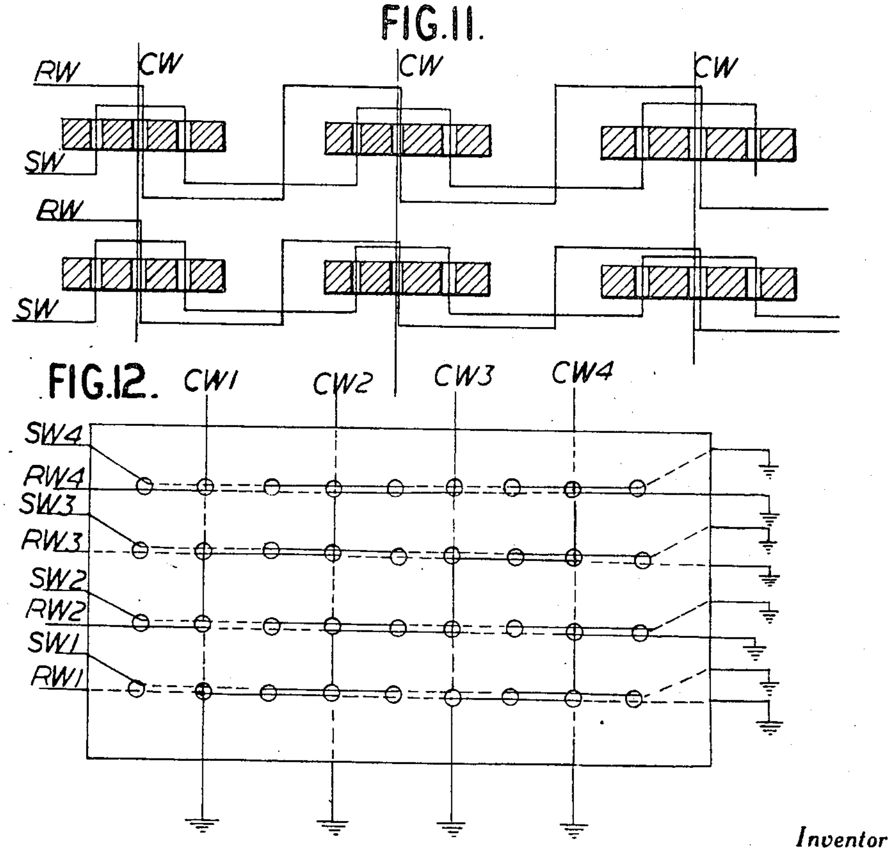

FIGURE 11 is an array using for each element a separate three-hole unit, as in FIGURE 10, but in which each unit is arranged in the manner shown in FIGURE 6.

FIGURE 12 is a perforated plate using a development of the arrangement of FIGURE 6.

Figure 13:
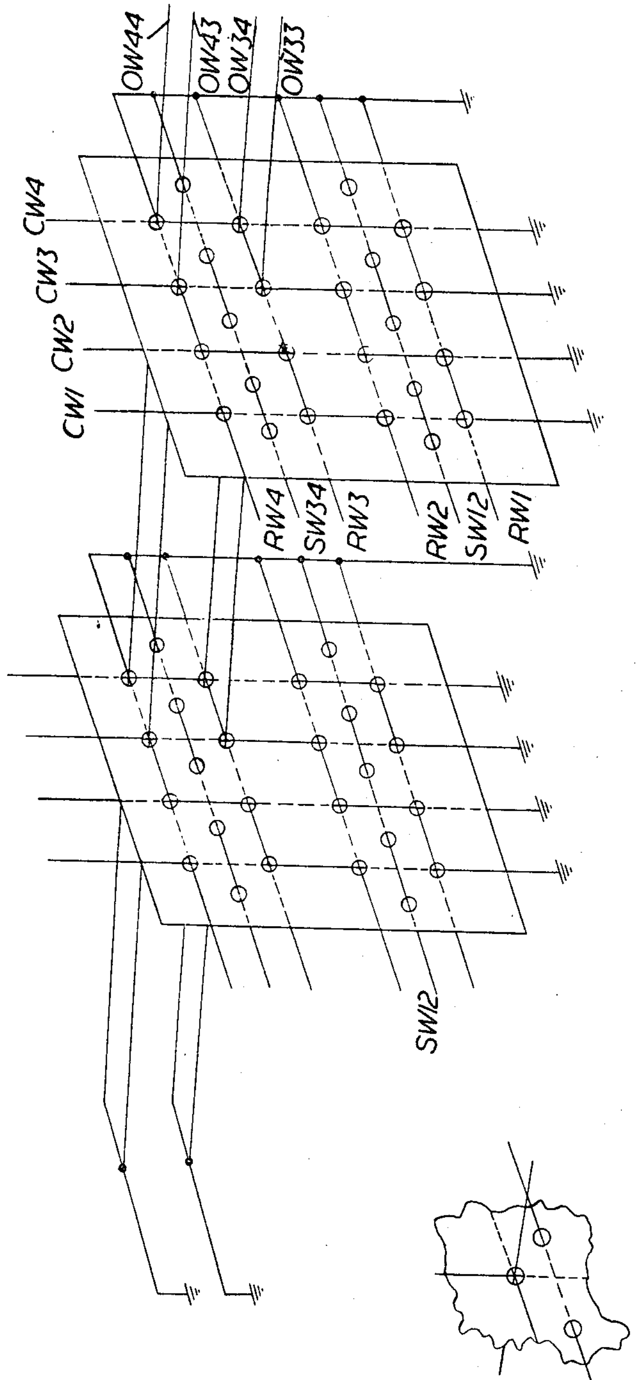

FIGURE 13 is a multi-plane array which represents a further development of the arrangement of FIGURE 6.

Figure 14:
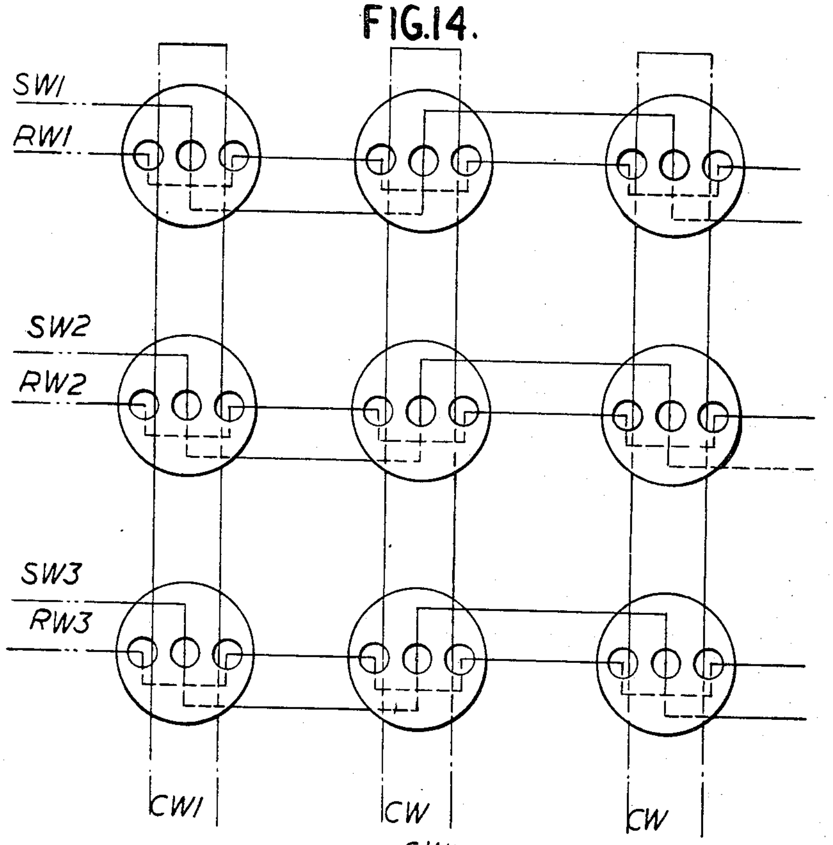

FIGURE 14 shows a coordinate memory array which is generally similar to that shown in FIGURE 10, but in which each memory unit is a disc of a square-loop material along whose diameter are three holes.

Figure 15:
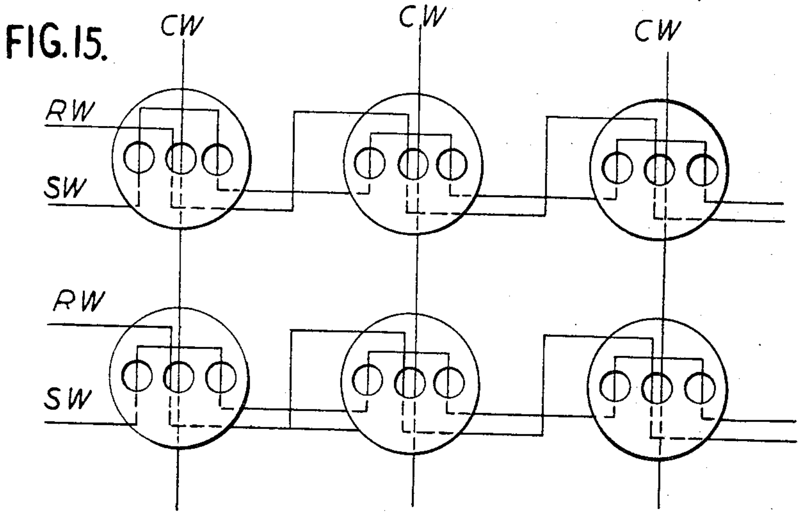

FIGURE 15 is an array which is generally similar to that of FIGURE 11 but in which each memory unit is a disc of a square-loop material along whose diameter are three holes.

Figure 16:
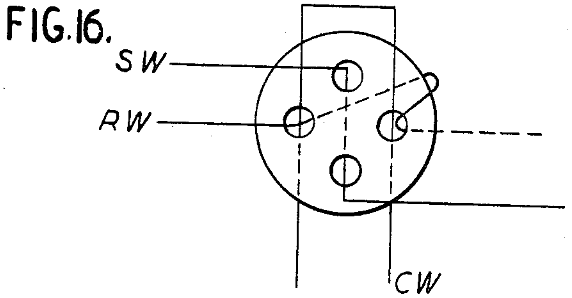

FIGURE 16 shows schematically a four-hole memory unit.

Figure 17:
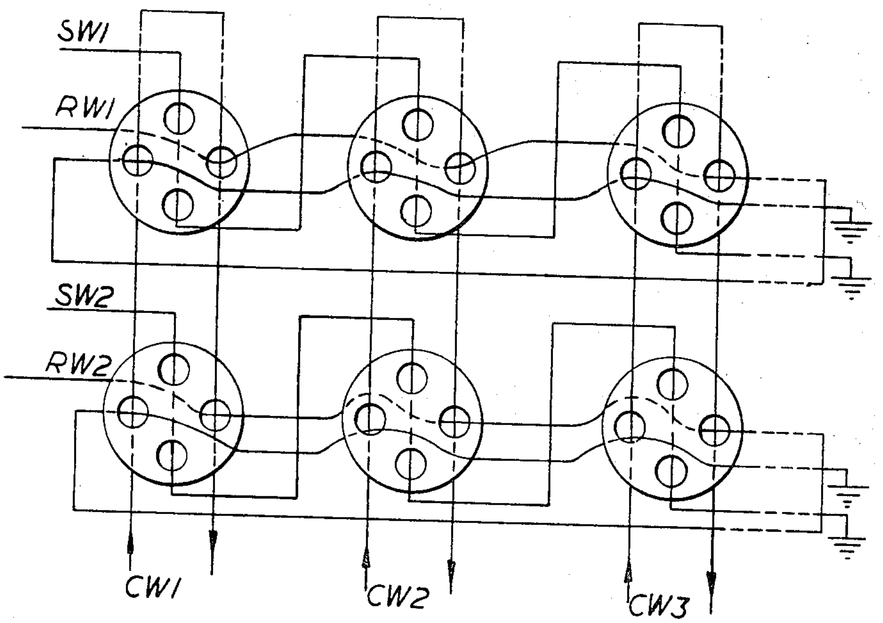

FIGURE 17 shows a 3 x 3 matrix using units such as that of FIGURE 16.

Figure 18:
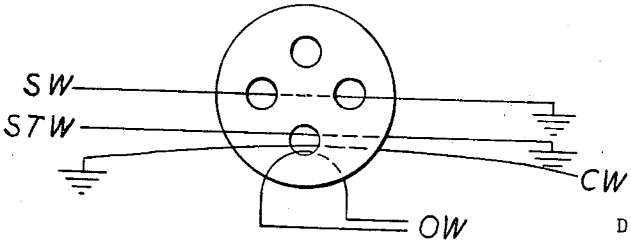

FIGURE 18 shows another wiring arrangement using a four-hole disc but in which only three of the holes are used.

*General introduction*

A coordinate memory matrix according to the present invention uses for each bit, i.e. each element which can be set to either one of two conditions "1" or "0," three individual cells. These cells are each formed by the material surrounding a hole in a plate or block of a "square-loop" ferromagnetic material. There are two alternative arrangements using three cells per bit.

In the first arrangement there is a group of three holes in the plate or block, the material which surrounds a hole forming one of the cells. One case in which the three holes are in a straight line the outer two cells are used for storage while the inner cell is used for sensing the stored data. To store data the two cells are set oppositely: thus it will be assumed that to store "0" they are set to SN while to store "1" they are set to NS, the two remanence states being referred to as S and N respectively. To read the stored element, a pulse is applied to a reading wire which passes through the central hole of the three. The flux which this pulse induces in the material surrounding the central hole interacts with the flux due to the remanence state of the two "storage" cells in such a way as to produce, on a wire threading the "storage" cells, a pulse which coincides with the leading edge of the pulse on the reading wire and a pulse which coincides with the trailing edge of the pulse on the reading wire. These two pulses of opposite polarity and the order in which they occur i.e. positive-negative or negative-positive, indicates whether "0" or "1" is stored. The read-out obtained in this way is non-destructive, i.e. it does not destroy the stored intelligence.

The holes need not be in a straight line, but could be in a triangular formation provided that flux induced around the central hole can interact with fluxes around the other holes, and that there is substantially no interaction between the fluxes around the other two holes.

The second arrangement is, in effect, an inversion of the first in that, of the three cells used for one bit, the central cell is used for storage and the outer two are threaded by the sensing wire. The central cell is set, in the usual way, to its N or S state to represent whichever of the two possible conditions "1," or "0," is to be stored. When a pulse is applied to the reading wire, which threads the two outer cells in opposite directions, the fluxes produced thereby interact with the flux due to stored bit. As before a pulse pair occurs on a wire which threads the central cell, and the order of these pulses, positive-negative or negative-positive, indicates the nature of the stored element. This arrangement has an advantage over the arrangement briefly described above that in certain cases reading cells can each be common to two or more elements. Hence for *n* storage cells, there is a row of (2+1) equally-spaced cells, each formed by the material surrounding a hole in a plate or block of square-loop material. The reading wire then threads all odd-numbered cells, the even-numbered cells being used for storage.

A convenient storage unit for the above two arrangements is a small disc of a square-loop ferrite drilled with three holes. The material which surrounds those three holes thus forms the three cells referred to in the preceding paragraphs. These discs can be wired in a suitable manner to form storage matrices, as will be described later.

Another form of storage unit which can be used for non-destructively read matrices is a disc of a square-loop material drilled with four holes in a square formation. The material which surrounds these holes thus forms four storage cells. Such units can be used in a matrix wherein the "two holes per bit" technique of our Patent specification No. 796,488 (Ridler et al. 50–2) is used, in which case one pair of diagonally-opposed cells is used as the storage cells and the other pair as the reading cells.

Such a four-hole disc can also be used as a unit of a matrix using either of the "three hole per bit" techniques described above, in which case one hole is not used.

*Operation of the first arrangement (FIGURES 1–5)*

The arrangement wherein there are two storage cells with a reading cell therebetween will now be described with reference to FIGURE 1. This shows a plate P of square-loop ferromagnetic material which has three holes 1, 2 and 3 arranged in a straight line. As already indicated, the holes could be arranged in a triangular configuration. The material surrounding the holes 1 and 3 forms the two storage cells, which are threaded by a row wire RW and a column wire CW, while the material surrounding the central hole 2 forms the reading cell, which is threaded by a reading wire SW. It will be noted that both wires pass through the hole (cell) 1 from top to bottom, and through the hole (cell) 3 from bottom to top.

To write "1" in the pair of storage cells, positive pulses of ampliude I/2, I being the amplitude necesary to change a cell's state from N to S or S to N, are applied simultaneously to the wires RW and CW. The direction which the wires pass through the cell 1 is such that a positive drive of I sets the cell 1 to N (if not already there), while since the wires pass through cell 3 in the opposite direction the same drive sets cell 3 to S (if not already there). Hence for a coincident positive drive as just described, cell 1 is set to N while cell 3 is set to S, so that the condition of cells 1 and 3 for 1 stored is NS. Flux is assumed to be clockwise for a cell set to N and anti-clockwise for a cell set to S, so that the "solid" arrows in FIGURE 1 represent the flux conditions for 1 stored.

To write "0," negative pulses of amplitude L/2 are applied simultaneously to the wires RW and CW, and the effect of these is to set the cells 1 and 3 to S and N respectively, i.e. the condition for "0" stored is SN. The flux conditions for "0" stored are indicated by the chain-dotted arrows.

From the above description it will be seen that, whatever the condition of the two storage cells before the two half-write pulses occur, the coincidence of positive half-write pulses on RW and CW sets the storage cells to NS, while the coincidence of negative half-write pulses on RW and CW sets the storage cells to SN.

Figure 1:
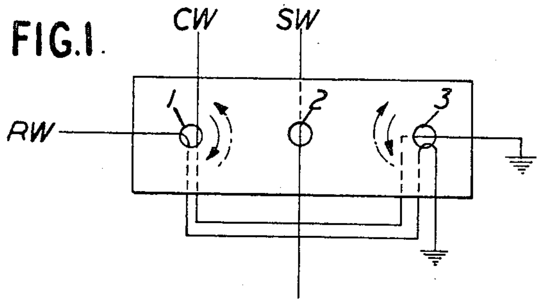

FIGURE 2*a*, simplified from FIGURE 1, shows three holes in a piece of square-loop material, with a "1" bit stored in the two outer cells. The two arrows show the flux state for "1" stored—clockwise in the left-hand cell and anti-clockwise in the right-hand cell. SW, as in FIGURE 1, is the reading wire, while OW, which threads the two storage cells in opposite directions, is an output wire. In the so-called "direct-access" method of operating a co-ordinate memory matrix, which will be described later, OW could be the column wire for the unit shown. The reading pulse produces the pulse pair shown to the right of the piece of square-loop material. That is, a positive pulse on the leading edge of the pulse on SW and a negative pulse on the trailing edge of the pulse on SW.

FIGURE 2*b* is a similar sketch for the condition where "0" is written in the two storage cells. Hence it will be seen that a negative pulse is obtained on the leading edge of the pulse on SW and a positive pulse on the trailing edge thereof.

This method of reading stored information does not destroy the information. Further, as will be seen later, the polarity of the pulses produced on the output wire is dependent only on the direction of the remanent flux caused by the stored information. It is independent of the direction of the pulse current in the reading wire.

One three-hole storage element which was tested had three holes each having a nominal diameter of 20 mils, the holes being spaced apart (center-to-center distance) 35 mils. The full-write current value was 280 ma., i.e. half-write currents of 140 ma. The value of the reading current was 100 ma., which gave output voltages in the range 50–100 mv. The rise times of the output pulses follow very closely the rise and fall times of the reading pulses, and each output pulse is of short duration—about 100 milli-microsecs. The separation between the two pulses generated by a pulse on the reading wire is, of course, dependent on the length of the reading wire pulse. If this pulse is very narrow, then a complete read-out can be made to occupy about 200 milli-microsecs.

The spacing of the three holes in the plate of square-loop material, and the radial penetrations of the stored remanent flux around the two outer holes are such that, in the absence of a reading pulse on the wire SW through the central hole, the remanent magnetic field in between the two outer holes is essentially unidirectional—see the arrows showing the flux direction in FIGURES 1 and 2*a*. When a reading pulse is applied to the wire SW, the flux which it induces around the central hole increases the field on one side of the central hole and decreases the field on the other side thereof. It is this interaction which enables the non-destructive read-out described above to be obtained. The theory of operation of the method of non-destructive read-out described above will now be discussed with reference to FIGURES 4 and 5. It is believed that this theory is substantially correct.

In FIGURE 4*a*, in which the wires are omitted in the interest of clarity, the dotted arrows show the flux conditions of the outer holes for "1" stored and the solid arrows show the flux due to a sensing pulse. This shows that, with the pulse direction assumed, the fluxes oppose on the left-hand side of the central hole and augment on the right-hand side. FIGURE 4*b* shows the corresponding fluxes for "0" stored, in which the fluxes augment on the left-hand side of the central hole and oppose on the right-hand side thereof.

Figure 5:
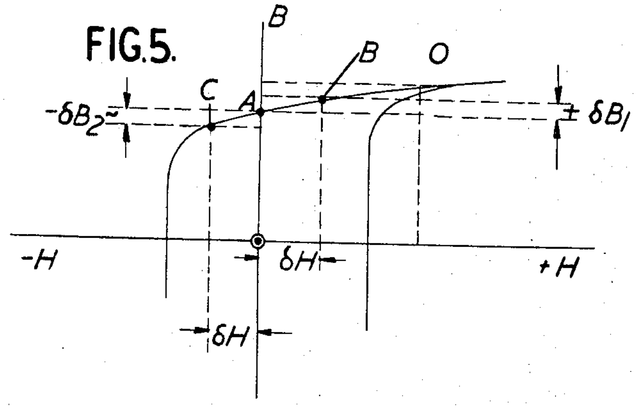
FIGURE 5 shows in more detail part of the hysteresis loop shown in FIGURE 3.

The partial hysteresis curve of FIGURE 5 will now be considered, it being assumed that the two outer holes have been set to the SN condition, i.e. 0 stored. The material between the two storage holes is therefore at the remanence point A, and the stored flux value is $+B_R$. When a reading pulse is applied to the wire which threads the central hole, the flux distribution is disturbed, and as can be seen also from FIGURE 4*b*, the magneto-motive force induced by the reading current assists the flux build up to left of the central hole and inhibits, and to some extent, reverses it to the right of the central hole.

Assuming that the magneto-motive force at a radius $r$ from the central hole is $\delta H$, then at this radius the magnetic state of the material to the left of the central hole is represented by point B on the hysteresis loop. This represents a change of flux of $+\delta B_1$. Similarly the magnetic state of the material at this radius on the right-hand side of the central hole is represented by point C, which represents a flux change of $-\delta B_2$. Now the slope of the "horizontal" section of the hysteresis characteristics of the square-loop material in the direction of positive magnetization $+H$ is less than the slope in the direction of negative magnetization $-H$. Therefore $\delta B_2$ is greater than $\delta B_1$, so that the reading pulse causes a change in the total flux contained in the material between the two outer holes. Since the output wire is linked to the flux between the two outer holes, an e.m.f. is induced thereinto when the reading pulse occurs. As already indicated, the direction of change produced is dependent on the stored intelligence, so that for 1 the output on the leading edge of the reading pulse is positive while for 0 it is negative. When the reading pulse ends the field pattern reverts to the original remanent state, which means that a second output occurs at the end of the reading pulse. This output is opposite in polarity to the output at the commencement of the reading pulse.

If the reading pulse has a sharp (i.e. quick-rising) leading edge and a slow-falling trailing edge, for instance, if the reading pulse is of saw-tooth shape, then the leading edge pulse produced on the output wire is a sharp pulse while the trailing edge pulse is of lower amplitude but greater duration. With such an output due to a reading pulse there is little possibility of misinterpreting an output which has been subject to delays due to a relatively long output wire. Such delays might otherwise be troublesome even if the wire is properly terminated. Further, the sensing of the output can be effected with differential squaring amplifiers, eliminating the need to use a "threshold" method to distinguish between a "1" and a "0" output. This latter is of special importance where output levels are low and where noise is present. Thus by using such a read pulse the detection of the read output might be amplified. It will be apparent that if the read puse has a slow-rising leading edge but a sharp trailing edge, then the output pulse pair will be a long shallow pulse on the leading edge and a larger but shorter pulse on the trailing edge. This latter may in certain cases be preferable to the use of a reading pulse with a sharp leading edge and a shallow trailing edge.

The energy needed to move the remanent point from position A to position B or C is small, provided that the value of $\delta H$ does not approach the "knee" of the hysteresis loop. This means, in effect, that no domain wall movement occurs. Since it is the latter which usually restricts the speed at which a square-loop material can be switched, the reading process described above can be very fast.

*Operation of the second arrangement (FIGURES 6 and 7)*

This, as already mentioned, is, in effect, the inverse of the arrangement already described. The geometrical arrangement of the holes in the piece of square-loop material can be the same as used in the earlier-described arrangement. The cental hole, or to be more precise, the ferromagnetic material which surrounds that hole, is used as a normal single storage cell, being threaded, in FIGURE 6, by a row wire RW, a column wire CW and an output wire OW. As will be seen later, when the so-called "direct access" selection method is used the column wires can also be used as output wires. The reading wire SW passes through the two outer holes, as shown in FIGURE 6.

Figure 7:
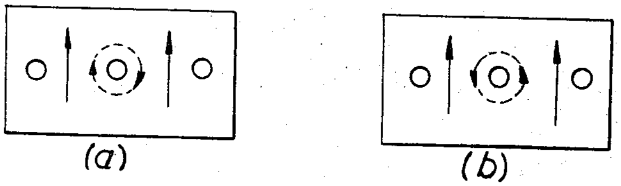

The theory by which the non-destructive reading occurs is generally similar to that for the arrangement already described, the flux patterns being shown in FIGURE 7. Thus in FIGURE 7*a*, which shows by the dotted arrows the direction of flux due to a stored "1" bit and by the solid arrows the flux due to a reading pulse (since the reading wire threads the two outer holes in opposite direction), it can be seen that the fluxes augment on the left and oppose on the right. FIGURE 7*b* is the corresponding diagram for "0" stored. Hence it will be seen that the effect of the reading pulse is exactly the same as it was in the previously described arrangement.

This arrangement has the advantage compared with that described first that it allows for simpler wiring because the selection wires each only pass through one cell of the storage unit, instead of two in the case of the first arrangement. Further, as will be seen below, reading cells can be shared between two adjacent storage cells. A saw-tooth reading pulse can be used in this arrangement in the same manner as in the first-described arrangement.

*Memory matrices using the above principles*

FIGURE 8 shows schematically a 3 x 3 memory matrix in which each element is a three-hole unit wherein the two outer holes form the storage cells and the central hole forms the reading cell. The rows of the matrix each consist of a block or strip of a square-loop material, preferably a ferrite, having a line of holes arranged as shown. Three row wires RW1, RW2 and RW3, three column wires CW1, CW2 and CW3, and three reading wires SW1, SW2 and SW3 are shown. As will be seen, the column wires function also as output wires. Writing uses the coincident current technique, and it is assumed that the "direct-access" method is used. In this method each row of storage units contains a single word, i.e. a single group of related binary bits such as a number. It is assumed that all storage units are initially in the 0 condition, i.e. the left-hand cell in condition S and the right hand cell in condition N.

When a word is to be written in a row, a positive pulse of half-write amplitude is applied to that row's row wire, and positive half-write pulses applied to the column wires of units to be set to 1 and negative half-write pulses to column wires of units to be set to 0. The result of this is to set the storage cell pairs whose row and column wires both carry positive pulses to the NS condition, and to leave the cell pairs whose row and column wires carry a positive and a negative pulse at 0.

To read the word in a row, a reading pulse is applied to its reading wire, e.g. SW1, which threads the central holes of each trio of holes of the "wanted" row. This produces a pulse pair on each column wire, each pulse pair consisting as already described of two pulses of opposite polarity. It is assumed that a positive pulse followed by a negative pulse represents a 1 bit, while a negative pulse followed by a positive pulse represents a 0 bit. Each column wire is connected to two circuits, one being an input circuit to which a positive or a negative half-write pulse can be applied (as already described), while the other is a detector circuit of well-known type which is enabled coincidentally with a reading pulse and which can discriminate between the two types of pulse pair.

When a new word is to be written, it is necessary to reset all storage units of the appropriate row to 0, which is done by applying negative pulses of full "write 0" amplitude to the row wire, setting all storage cell pairs to the SN condition. Alternatively, it is possible to achieve the same effect by applying negative half-write pulses to all column wires, and to the row wire of the row in which the new word is to be written.

FIGURE 9 shows a plate of square-loop material, the wiring being the same as that in the array of FIGURE 8. The broken lines represent wiring on the reverse side of the plate. Some at least of the wiring shown could be produced by "printed circuit" techniques.

FIGURE 10 shows an array similar to those of FIGURES 8 and 9, but in which each bit uses for its storage a unit formed of a small piece of a square-loop material having three holes disposed in a manner similar to that already described, and hence forming three cells. Such an arrangement may be preferred to the arrangements of FIGURES 8 and 9 when economy of the square-loop material is of significance.

FIGURE 14 shows an array which is similar to the array of FIGURE 10, but in which each storage unit is a disc of a square-loop ferrite such as that sold under our designation SF11 (SF is an abbreviation of our Registered Trade Mark "Stanferrite"), which has a thickness of 40 mils, a diameter of 115 mils and has a line of three holes along its diameter. These holes have nominal diameter of 25 mils and are spaced (center-to-center) by 35 mils. Since the wiring is the same as that of FIGURE 10 no further description of this array is necessary.

FIGURE 11 shows another array using individual units each with three holes, but in which the second method is used. That is, the material surrounding the central hole is the storage cell, while the reading wires each thread outer pairs of holes of each trio. The operation of this array is similar to that of those of FIGURES 8, 9 and 10.

FIGURE 15 shows an array similar to the array of FIGURE 11, but in which each storage unit is a disc such as that used in the array of FIGURE 15. The wiring is the same as that of FIGURE 11 so no further description of this array is necessary.

In FIGURE 12 there is shown a plate of a square-loop material using the three hole element in which the material surrounding the central hole is the storage cell. This exploits the fact already mentioned that the output obtained when a storage element is read is independent of the polarity of the pulse applied to the reading wire. As a consequence of this, the reading holes can be shared between adjacent storage elements in the same row, or, of course, in the same column. This reduces the number of holes required. In fact, for a row of $n$ storage cells there is required $(2n+1)$ holes, of which $n$ provide the storage cells while $(n+1)$ supply the reading holes.

The array shown is a 4 x 4 memory array in which there are four column wires CW1 to CW4, four row wires RW1, to RW4, and four reading wires SW1 to SW4. The arrangement of the wiring will be clear from a perusal of FIGURE 12.

Writing uses the same techniques as have already been described. Non-destructive read-out is effected by applying a reading pulse to the reading wire of the row from which intelligence is to be read. This, as usual, causes read-out on the column wires of all cells of the row to the reading winding of which a pulse is applied. If the content of one cell only of the row is to be read, then the detector circuit for that cell's column wire is the only one which is enabled at the same time as the reading pulse is applied.

The advantage of this form of matrix over those already described is, as already indicated, that there is a great reduction in the number of holes to be threaded. For instance, in a typical computer application each row of the matrix holds a single word, and the word length in digital computers varies from 28 to 40 bits. For a word length of 32 bits, it will be seen that a row only needs 65 holes, as compared with 96 holes when using the other forms of matrix described herein. This method of wiring is, as can be seen from FIGURE 12 very convenient where the wiring is "printed" onto the surface of a ferrite plate.

Where the memory is formed by a stack of memory planes a further reduction in the number of holes is possible. In this case a row of reading holes, consisting of $(n+1)$ holes is shared by two adjacent rows each of $n$ storage holes. Hence when a reading pulse is applied to the wire which threads such a row of holes, the pulses induced on the column wires will be meaningless because they represent the combined read-out from two rows. However, each storage hole in a plane has its own output wire which passes through correspondingly-numbered holes in all planes. Thus to read the contents of a given row in one plane, a reading pulse is applied to the reading winding for the "wanted" row, and the detector circuits for the output wires which thread the cells of that row in all planes are enabled. In such a case, all reading wires of the same memory plane could be connected in series. For a memory plane with $m$ rows, each of $n$ storage cells, this requires $m/2$ rows of reading holes, each row consisting of $(n+1)$ holes. Hence the total number of holes on the plane is $$mn+\frac{m}{2}(n+1)$$

This corresponds to approximately one and a half holes per bit of stored intelligence.

FIGURE 13 shows a 32 bit array, formed by two 4 x 4 memory planes constructed on this principle. In this array each plane contains rows of holes forming storage cells, and each row has associated with it a row of reading cells, which it shares with an adjacent row. Thus the holes which form one storage unit are arranged as in the inset to FIGURE 13.

Each storage cell is threaded by the appropriate row and column wires of the wires of its own plane, and also by an output wire passing through the correspondingly-numbered cells in all planes. Of these, 4 are shown, these being OW33, passing through the third cell in the third row of all planes OW34, passing through the fourth cell in the third row of all planes, OW43, passing through the third cell in the fourth row of all planes and OW44, passing through the fourth cell in the fourth rows.

Writing in such an array is effected by selecting the appropriate row and column wires of the "wanted" plane and energizing them in a manner appropriate to the intelligence to be written. As in the case of all the arrays which have hitherto been described, it is necessary to reset the location in which writing is to be performed to the 0 condition before the new intelligence is written.

Reading is effected by energizing the reading wire for the wanted row by a reading pulse, e.g. to read the second row in the second plane the reading wire SW12 for the first and second rows of that plane is pulsed. The resulting outputs on the column wires of the second plane are meaningless because both rows 1 and 2 are read, and so this read-out is ignored. However, pulse pairs which represent the contents of the wanted row appear on the output wires (not shown) which pass through the cells of the wanted row. Hence at the same time as the wanted row's reading wire is pulsed, the detector devices associated with the appropriate set of row output wires are enabled. Hence the wanted data is read. As before, the read-out is non-destructive. Where the state of a single memory cell is to be read, of course, only a single one of the detector devices of the output wires is enabled. Hence it is possible to read any one or more elements of any one of the rows of storage cells in anyone of the planes of the array.

With this system it would be possible for all reading wires of a single plane to be connected together.

The memory arrays described above which use a single strip of ferromagnetic material for a whole row of elements, or a single plate for a number of rows have the disadvantage as compared with the arrays such as FIGURES 10, 11, 14 and 15 that greater control of operating conditions is necessary than in the case for the arrays such as those of FIGURES 10, 11, 14 and 15. However, in certain cases the advantages of the "strip" and "plate" arrangements mentioned in the preceding description may compensate for these disadvantages.

*Operation of the four-hole unit (FIGURE 16)*

Figure 2:
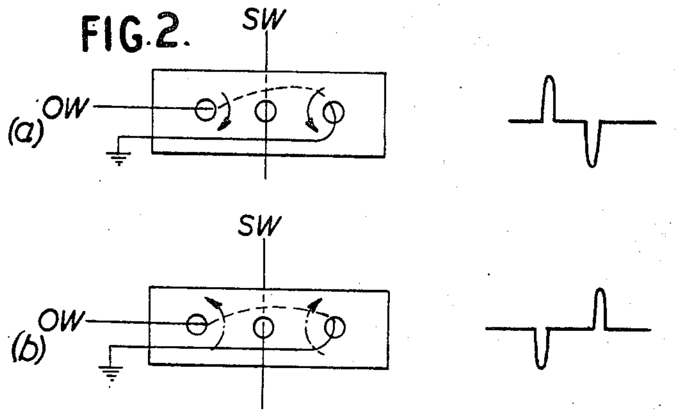
Figure 3:
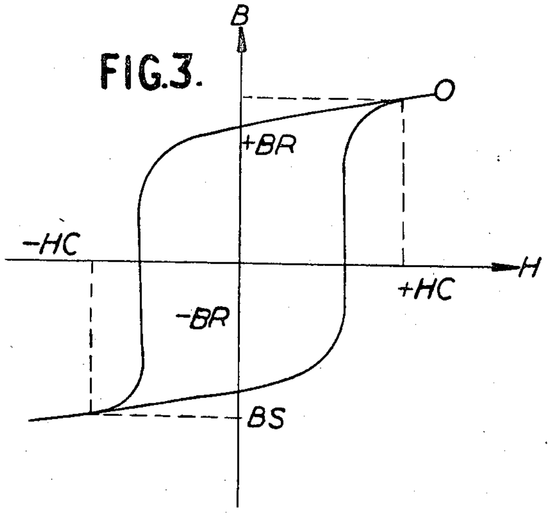
Figure 4:
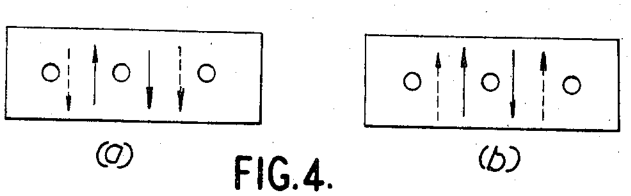

This resembles the technique of the second method of operation described above, i.e. where the pair of reading cells are associated with a single storage cell, but with the extension that two cells are used to store data. FIGURE 16 shows the arrangement where the unit is used as part of a matrix in which the two cells per bit technique of Patent No. 796,488, above mentioned, is used. Data storage is effected in the same manner as has been described for the matrix of FIGURE 11. To read the stored data, a pulse is applied to the reading wire SW. If the pulse is of rectangular shape, then pulse pairs such as shown in FIGURES 2*a* and 2*b* are produced for 1 stored and 0 stored respectively. However, the preferred method is to use a saw-tooth pulse with a sharp leading edge, when the trailing edge pulses shown in FIGURE 2 are replaced by longer and shallower pulses. As already explained the use of such a reading pulse leads to advantages in operation.

FIGURE 17 shows a 3 x 3 matrix using units such as that of FIGURE 16. In view of the previous description it is not believed necessary to describe this figure in detail. The material used for the discs is the square-looped ferrite sold under the designation SF3, each disc having a thickness of 40 mils and a diameter of 100 mils. The four holes, which are arranged in a square are each 27 mils from the center of the disc and have nominal diameters of 25 mils.

In this matrix, to write a word into one row, a positive pulse of full write amplitude is applied to its row wire, e.g. to RW1, and positive half-write pulses are applied to the column wires which thread units to be set to 1 and negative half-write pulses are applied to other column wires. These pulses are applied to the left-hand end of the column wires. Reading uses a pulse on the appropriate read wire, e.g. SW1, which is of saw-tooth form, with a sharp leading edge. The column wires, which also act as output wires, then have pulse pairs consisting of a sharp positive pulse followed by a longer, shallower, negative pulse for 1 read, and a sharp negative pulse followed by a longer, shallower, positive pulse for 0 read. Cancellation of the data in one row is by applying thereto a negative pulse of 1½ times the full write amplitude.

FIGURE 18, represents a single four-hole disc used as one unit in the second "three-hole" method described above. SW is the reading wire, OW the output wire and the other two wires STW and CW represent the setting and the cancelling wires.

While the principles of the invention have been described above in connection with specific embodiments, and particular modifications thereof, it is to be clearly understood that this description is made only by way of example and not as a limitation on the scope of the invention.

What we claim is:

1. A co-ordinate array of rows and columns of ferromagnetic units for the storage of intelligence, in which each said unit comprises a piece of a ferromagnetic material having a substantially rectangular hysteresis loop and having four holes arranged in a square, in which the material which surrounds the holes in each said piece forms two storage cells and two reading cells, the two storage cells being one pair of diagonally opposed cells and the two reading cells being the other pair of diagonally opposed cells, in which a number of row wires are provided, each threading the storage cells of all of the ferromagnetic units of its array and passing through the two storage cells of the same unit in the same direction, in which a number of column wires are provided, each threading the storage cells of all of the ferromagnetic units of its column of the array and passing through the two storage cells of the same unit in opposite directions, in which for each row of the array there is provided a reading wire which threads the reading cells of all of the ferromagnetic units of its row and passes through the two reading cells of the same unit in opposite directions, in which to store a word in a two condition code in a row of the array a pulse of one polarity and having the amplitude necessary to change the state of a storage cell from one to the other of its remanent states is applied to that row's row wire, and while said pulse is present on said row wire pulses of said one polarity and half the amplitude thereof are applied to the column wires threading the storage cells of units to be set to store one of said two conditions and similar half amplitude pulses of the other polarity are applied to the column wires threading the storage cells of units to be set to store the other of said two conditions, in which the result of said pulse applications in that for one condition of said code one storage cell of a unit is set to its first remanent state and the other storage cell of a unit is set to its second remanent state, and for the other condition of said code said one storage cell is set to its second remanent state and the other storage cell is set to its first remanent state, in which to cancel the intelligence stored in a row of said array a pulse of said second polarity and whose amplitude is one and one half times the amplitude necessary to change a storage cell from one to the other of its remanent states is applied to that row's row wire, in which to read the intelligence stored in a row of said array a read pulse is applied to the read wire which threads the reading cells of the ferromagnetic units of that row, which read pulse causes outputs of one nature to be obtained on the column wires threading the storage cells of units of that row which are storing said one of said two conditions and output of a different nature to be obtained on the column wires threading the storage cells of units of that row which are storing the other of said two conditions, and in which said cells are so dimensioned and so located with respect to each other, and the characteristics of said reading pulse are such, that the reading of the state of the storage cells of the units of a row of the array does not destroy the intelligence stored in that row.

2. A co-ordinate array as claimed in claim 1, in which each said piece of a ferromagnetic material is a disc of a ferrite having a substantially rectangular hysteresis loop.

References Cited

UNITED STATES PATENTS

| | | | |
|---|---|---|---|
| 2,942,240 | 6/1960 | Rajchman et al. | 340—174 |
| 3,093,817 | 6/1963 | Rajchman et al. | 340—174 |
| 3,102,328 | 9/1963 | Schultz et al. | 340—174 |
| 3,315,237 | 4/1967 | Kallmann | 340—174 |

STANLEY M. URYNOWICZ, Jr., *Primary Examiner.*